United States Patent
Barroso

(10) Patent No.: US 8,726,757 B2
(45) Date of Patent: May 20, 2014

(54) DEVICE FOR ADJUSTING THE POSITION OF A STEERING COLUMN

(75) Inventor: Michel Barroso, Courtenay (FR)

(73) Assignee: Renault Trucks, St. Priest (FR)

( * ) Notice: Subject to any disclaimer, the term of this patent is extended or adjusted under 35 U.S.C. 154(b) by 381 days.

(21) Appl. No.: 12/738,336

(22) PCT Filed: Nov. 13, 2007

(86) PCT No.: PCT/IB2007/004277
§ 371 (c)(1),
(2), (4) Date: Apr. 16, 2010

(87) PCT Pub. No.: WO2009/063268
PCT Pub. Date: May 22, 2009

(65) Prior Publication Data
US 2010/0218637 A1  Sep. 2, 2010

(51) Int. Cl.
*B62D 1/18* (2006.01)

(52) U.S. Cl.
USPC .......................................................... 74/493

(58) Field of Classification Search
USPC ............................................ 74/493; 280/775
See application file for complete search history.

(56) References Cited

U.S. PATENT DOCUMENTS

| | | | |
|---|---|---|---|
| 3,556,549 A * | 1/1971 | Hershman et al. | 280/775 |
| 3,737,003 A * | 6/1973 | Beals et al. | 180/78 |
| 4,046,024 A * | 9/1977 | Broucksou | 74/493 |
| 5,168,768 A * | 12/1992 | Easton | 74/493 |
| 5,890,397 A * | 4/1999 | Stoner et al. | 74/493 |
| 7,069,809 B2 * | 7/2006 | Sato et al. | 74/493 |
| 2003/0188598 A1 * | 10/2003 | Cartwright | 74/493 |
| 2006/0186658 A1 * | 8/2006 | Yasuhara et al. | 280/775 |

FOREIGN PATENT DOCUMENTS

| | | |
|---|---|---|
| DE | 102007021907 A1 | 12/2007 |
| EP | 1048547 A | 11/2000 |
| EP | 1886896 A1 | 2/2008 |
| WO | 2006108631 A | 10/2006 |

OTHER PUBLICATIONS

International Search Report for corresponding International Application PCT/IB2007/004277.
Official Action from corresponding European Application 07 859 315.9.

* cited by examiner

Primary Examiner — Justin Krause
(74) Attorney, Agent, or Firm — WRB-IP LLP

(57) ABSTRACT

A device is provided for adjusting, in a vehicle cabin, the position of a steering wheel secured at the free end of a steering shaft. The device includes an adjusting arrangement for adjusting, in a preferred driving position, the position of the steering wheel in at least one direction, the adjusting arrangement being supported by a retracting arrangement capable of moving the steering wheel into a retracted position wherein the steering wheel does not protrude into the vehicle cabin while maintaining unaltered, with respect to the adjusting arrangement, the preferred driving position. The device makes it possible to maintain the individual adjustment carried by a driver when the steering wheel is moved into retracted position.

24 Claims, 4 Drawing Sheets

DEVICE FOR ADJUSTING THE POSITION OF A STEERING COLUMN

BACKGROUND AND SUMMARY

The present invention relates to a device for adjusting the position of a steering wheel of a vehicle and more specifically of an industrial vehicle.

A cabin of an industrial vehicle has to provide a satisfactory driving environment for a vehicle driver but also has to provide a satisfactory living environment. On long haul journeys, the vehicle cabin constitutes the driver's living environment where the driver can rest and eat. It is therefore important that the driver can easily move around the cabin. That is why an industrial vehicle can be equipped with a retractable steering wheel. The steering wheel can be moved in a position substantially above the vehicle dashboard and therefore does not protrude too much into the cabin; thus, once the steering wheel is in a retracted position, the cabin offers more freedom of movement for the driver.

While it is important to offer the driver a comfortable living environment when the driver uses the cabin as a place for resting and relaxing, it is also important that a driver can adjust the position of the seat and the position of the steering wheel according to his/her morphology. To this end, the steering wheel is linked to the vehicle through a mechanism that allows transversal, axial and angular adjustment of the steering wheel position.

Furthermore, to provide easy entry into and exit from the cabin, the steering wheel might be put into a retracted position wherein the steering wheel does not protrude into the cabin. While this function is beneficial for accessing the cabin, it means that the specific position set by a driver is lost when the steering wheel is retracted for easy entry/exit.

By moving the steering wheel into a retracted position, the adjustment of the steering wheel position set by an individual driver is lost. Thus, when the driver moves the steering wheel form a retracted position to a driving position, the driver has to readjust the position of the steering wheel.

Another common problem of the current steering wheel is that when a driver modifies the position of the steering wheel in one direction, the position of the steering wheel is usually altered in other directions. For example when the angular position of the steering wheel is modified, the height of the steering wheel is also modified.

It therefore appears that there is room for improvements in the technical field of steering wheel position adjustment.

It is desirable to provide a device for adjusting the position of a steering wheel which allows comprehensive driving adjustment of the steering wheel position according to the requirements of any individual driver and allows moving the steering wheel into a retracted position while keeping the individual driving adjustment.

According to an aspect of the present invention, a device is provided for adjusting, in a vehicle cabin, the position of a steering wheel secured at the free end of a steering shaft. According to the invention, this device comprises adjusting means for adjusting, in a preferred position, the position of the steering wheel in at least one direction, said adjusting means being supported by retracting means capable of moving the steering wheel into a retracted position wherein the steering wheel does not protrude into the vehicle cabin while maintaining unaltered, with respect to the adjusting means, the preferred position.

Thus, the invention makes provision for a device for adjusting the position of a steering wheel whose kinematic line is divided into a first functional unit—retracting means—that can move with respect to a vehicle body according to, for example, a translation, a rotation or combination of two or more displacement and, operatively connected to the first functional unit, a second functional unit—adjusting means— that allows adjustment of a steering wheel's position according to one or more direction. The device according to the invention makes it possible to maintain the preferred position selected by a driver when the steering wheel is moved into retracted position. The steering wheel preferred position is to be understood as one of the various steering wheel positions that is best suited to a vehicle driver according to the driver's morphology, habit etc.

In a preferred embodiment, the device can comprise a primary bracket jointed onto a vehicle body with at least one degree of freedom; said primary bracket supports the said adjusting means for adjusting the position of the steering wheel in a preferred driving position and is capable of moving according to the at least one degree of freedom into a retracted position wherein the steering wheel does not protrude into the vehicle cabin.

The primary bracket can be rotatably mounted onto the vehicle body as it then allows lifting the steering wheel above a vehicle dashboard which minimizes the steering wheel protrusion into a vehicle cabin.

To permit rotation, the primary bracket can include a pin capable of rotation about one or more bores having a fixed position with regard to the vehicle body.

In a possible embodiment of the invention, the primary bracket can have a U shape comprised of two lateral wings connected by a back plate. U shape has the advantage of providing a sturdy device.

The device can also incorporate locking means capable of immobilizing the retracting means with regard to the vehicle body.

The adjusting means provide comprehensive adjustment of the steering wheel's position. The adjusting means can provide adjustment of the steering wheel position in a longitudinal direction with respect to the primary bracket and/or in a vertical direction with respect to the primary bracket and/or an angular adjustment of the steering wheel with respect to the primary bracket.

In a preferred embodiment of the invention, the device further can comprise a secondary bracket arranged to be movable with respect to the primary bracket along a longitudinal direction and a vertical direction. In functional terms, the secondary bracket provides the basis for adjusting the position of the steering wheel in a preferred position for an individual driver.

The primary bracket can be provided with at least one elongated window along which the secondary bracket is longitudinally guided. It is further envisaged that each lateral wing of the primary bracket is provided with three parallel elongated windows so as to prevent any undesirable play.

The device can further include at least one sliding plate guided by the at least one elongated window onto which the secondary bracket is attached.

To avoid any undesirable play, the device can comprise two sliding plates respectively guided by the elongated windows of each lateral wing of the primary bracket.

In a further preferred feature of the invention, the device can comprise at least two connecting rods having each a first end and a second end, the first end of each connecting rod being rotatably attached to a sliding plate and the second end of each connecting rod being rotatably connected to the secondary bracket, the two connecting rods defining an expanding parallelogram allowing a combined longitudinal and transversal movement of the secondary bracket with respect to the primary bracket.

Each sliding plate can be connected to the secondary bracket with three connecting rods to maintain a steady connection even if from a strictly kinematic view point, two connecting rods are sufficient.

To limit the scope of the secondary bracket movement, the at least one lateral window of the primary bracket can be provided with a polygonal window wherein a pin attached to the secondary bracket is engaged.

To suit most adjustment requirements, the window provided in the lateral wing of the primary bracket can be substantially quadrangular.

In an embodiment of the invention, the secondary bracket has a U shape comprised of two lateral wings connected by a back plate, each lateral wing having connecting pins onto which are connected the second ends of the connecting rods.

An important aspect of the invention is that each joint that forms the kinematic line of the device according to the invention can be locked independently. Therefore each adjustment that is made by a driver can remain unaltered when the steering wheel is moved into a retracted position.

Thus according to various embodiment of the invention, the device can incorporate locking means capable of immobilizing at least one of the sliding plates with regard to the primary bracket and/or the device can incorporate locking means capable of immobilizing the secondary bracket with regard to the primary bracket and/or the device can incorporate locking means capable of immobilizing the secondary bracket with regard to at least of the sliding plate.

According to an advantageous variant of the invention, the device can comprise means for adjustably joining the steering shaft onto the secondary bracket with at least one degree of freedom.

Preferably the device can comprise means for joining the steering shaft onto the secondary bracket capable of angularly adjusting the position of the steering shaft with regard to the secondary bracket.

Thus the steering wheel can be angularly adjusted according to the individual need of a driver. It can be emphasized that the steering wheel angular adjustment is independent from height or longitudinal adjustment. In other words, a driver can adjust the steering wheel's angular position and then adjust the vertical and longitudinal steering wheel position while the steering wheel's angular position remains unaltered.

For the angular adjustment of the steering wheel, at least one lateral wing can be provided with at least one curved opening wherein a steering shaft support is guided along a curved path.

Preferably, each lateral wing of the secondary bracket includes two concentric curved openings wherein two guiding pin are attached onto the two lateral wings of the steering shaft support.

It is envisaged that, the at least one curved opening has a centre of curvature that substantially coincides with the centre of the steering wheel.

Preferably, the device can incorporate locking means capable of immobilizing the steering shaft with regard to the secondary bracket.

DETAILED DESCRIPTION

The device 1 is described with reference to a vehicular XYZ frame wherein the X axis is the vehicle longitudinal axis, the Y axis is the vehicle transversal axis and the Z axis is the vehicle vertical axis.

Figure 1:
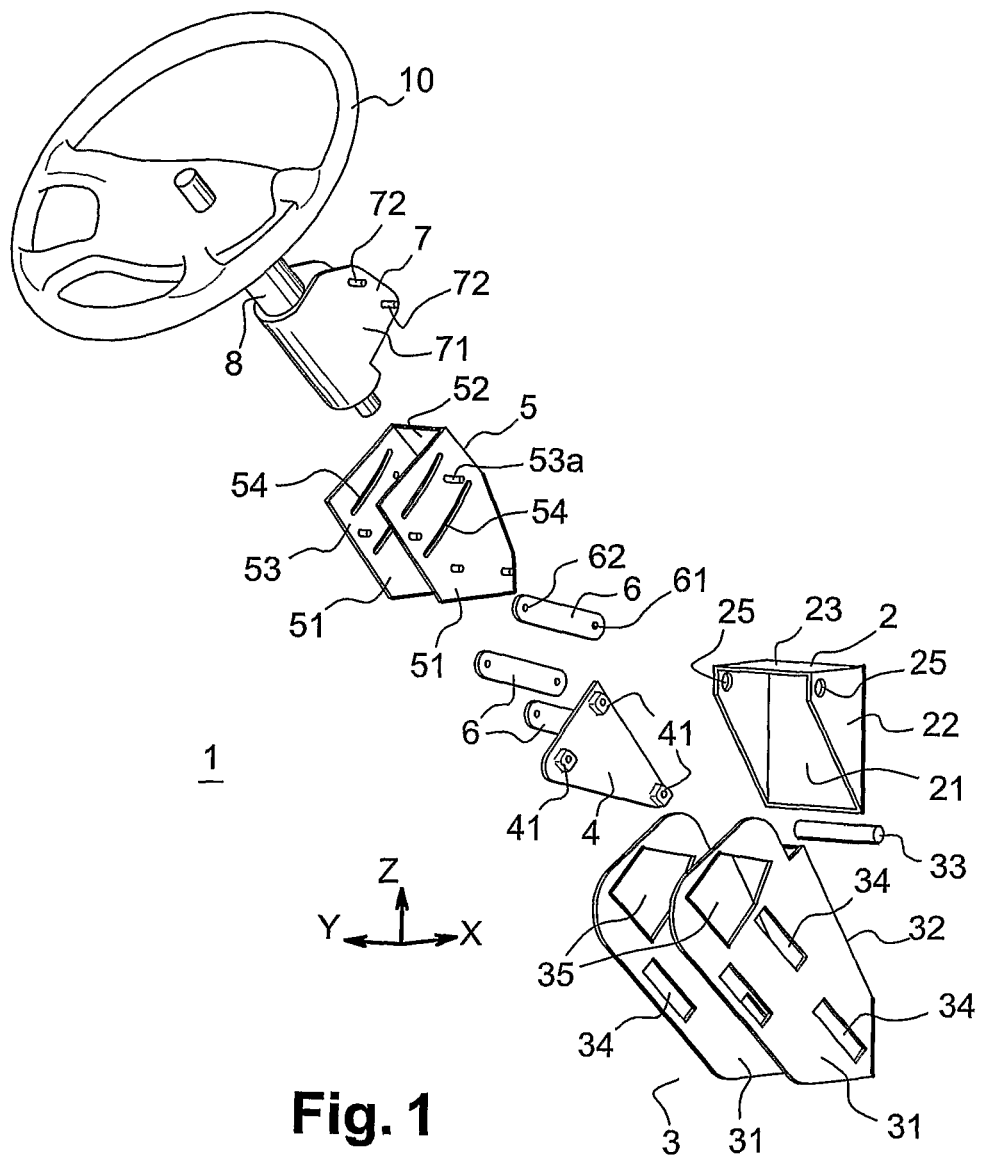
FIG. 1 is an isometric exploded view of an embodiment of the invention.

Reference is first made to FIG. 1. As illustrated on this Figure, the kinematics of the device 1 according to the invention is complex and will first be described starting from its end secured onto a vehicle body and finishing by its end supporting a steering wheel 10.

The device 1 includes a mounting console 2 that is suitably secured onto the body of a vehicle (not shown). The part of the body onto which the mounting console 2 is secured can be the cabin, for example, of an industrial vehicle such as a truck. As depicted on the drawings, the mounting console 2 can include a frontal plate 21, two symmetric lateral plates 22 and an upper plate 23 that joins the upper end of the two lateral plates 22. Each of the lateral plates 23 can have a triangular shape and is provided with a bore 25 at its upper end. The mounting console 2 can preferably be made of welded metal plates.

The device 1 according to the invention further includes a primary bracket 3 which is pivotally jointed onto the mounting console 2.

FIG. 1 shows that the primary bracket 3 can have a U shape with two lateral wings 31 connected by a back plate 32. The primary bracket 3 is provided with a pin 33 that is transversally orientated with regard to the said primary bracket 3; the pin 33 is slightly offset from the surface of the back plate of the primary bracket 3. Both ends of the pin 33 can pass through the bores 25 provided into the mounting console 2. Thus, in the illustrated embodiment of the invention, the primary bracket 3 can rotate about an axis defined by the two bores 25 provided into the mounting console 2. The primary bracket 1 can be attached to the mounting console 2 according to other mechanical joints allowing not only rotation but also translation or a combination of rotation and translation. Rotation of the primary bracket 3 can be preferred as it allows raising the steering wheel 10 above the vehicle dashboard as it will appear below. However, other motions of the primary bracket can be considered such as, for example, a motion of translation wherein the steering wheel 10 is moved laterally or vertically into a non protruding position.

The rotation of the primary bracket 3 is limited by a position wherein the back of the said primary bracket 3 rests on the two lateral plates 22 of the mounting console 2. As illustrated in the drawings, each of two wings 31 of the primary bracket 3 includes a series of openings. In the illustrated embodiment, each wing 31 symmetrically includes three elongated openings 34 that are substantially parallel to the back plate 32 of the primary bracket 3. The lateral wings 31 are also provided with a substantially quadrangular window whose purpose will be explained below.

Figure 6:
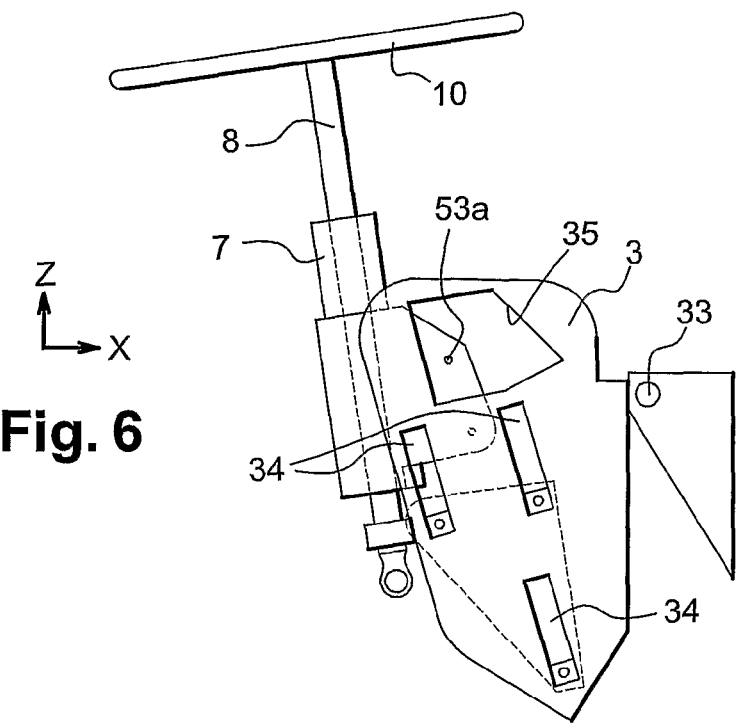
FIGS. 6 and 7 illustrate the range of movements that can be carried out by a steering wheel when it is retracted to and from a preferred driving position
Figure 7:
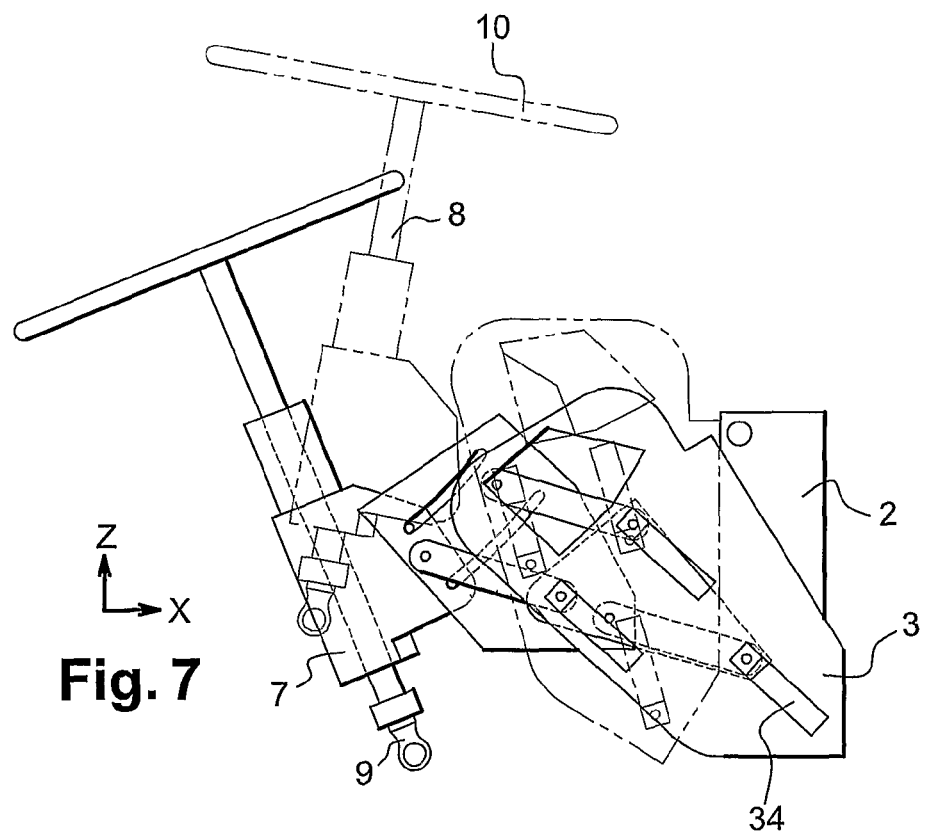

The device 1 can suitably be provided with a locking mechanism (not illustrated) that can immobilize the primary bracket 3 with regard to the mounting console 2 either in a retracted position as shown on FIG. 6 or in a use position as shown on FIG. 7. The locking mechanism can include, far example, a cam that can be moved by a lever between a locking position in which the cam immobilize the primary bracket 3 with regard to the mounting console 2 and an unlocking position in which the cam authorises a relative motion of the primary bracket 3 with regard to the mounting console 2.

An elastic means such as a spring (not illustrated) can be interposed between the mounting console 2 and the primary bracket 3 to assist the rotation of the primary bracket 3. It is also envisaged to fit a motor to provide power assistance to the rotation of the primary bracket 3.

The primary bracket 3 is provided with means for adjusting the position of the steering wheel 10 in a substantially vertical direction. Thus in the illustrated embodiment of the invention, the primary bracket 3 is provided with one or more sliding plates 4; each sliding plate 4 is attached to the primary bracket 3 in sliding fashion wherein the sliding plate 4 is guided along a straight (or curvilinear) path with respect to the primary bracket 3.

As illustrated in the drawings, the elongated openings 34 of each lateral wing 31 guide a sliding plate 4. For the clarity of FIG. 1, only one sliding plate 4 is shown, but it is understood that both lateral wings 31 of the primary bracket 3 can be fitted with a sliding plate 4. Each sliding plate 4 can be, as depicted in the drawings, of triangular shape and can be provided with three protruding guiding pins 41 located at each angle of the sliding plate 4. Each guiding pin 41 of the sliding plate 4 is engaged into a respective elongated opening 34 so that the sliding plate 4 can have a translating movement with respect to the primary bracket 3. The sliding plate translating movement is straight or curvilinear depending on the geometry of the elongated openings 34. The elongated openings 34 are oriented axially along a direction which ultimately provides a vertical adjustment of the steering wheel 10 as it will be appear below. The sliding plate's movement is limited by the dimension of the elongated opening 34 provided into the primary bracket 3. Locking means can be provided to immobilize the sliding plates 4 with regard to the primary bracket 3 in a position that is preferred by a driver. An elastic means such as a spring (not illustrated) can be interposed between the primary bracket 3 and the sliding plates 4 to assist the sliding movement of the sliding plate 4. It is also envisaged to fit a motor to provide power assistance to the sliding movement of the sliding plates 4.

The device 1 according to the invention includes a secondary bracket 5 that has two degrees of mobility with respect to the primary bracket 3. According to the invention, the position of the secondary bracket 5 is adjustable according to a longitudinal (X axis) and a vertical (Z axis) direction with respect to the primary bracket 3.

The secondary bracket 5 can be substantially U shaped and is comprised of two lateral wings 51 linked together by a back plate 52. In the illustrated embodiment, the lateral wings 52 of the secondary bracket 5 are each provided, with three connecting pins 53. Three matching connecting pins are positioned on the surface of each sliding element 4

The operational connection between the secondary bracket 5 and the primary bracket 3 is established, in the illustrated embodiment of invention, by two series three connecting rods 6 which provide a sturdy linkage. From a strictly mechanical point of view, a minimum two connecting rods is required. The connecting rods 6 are identical and are provided with a hole at each of their first end 61 and second end 62. At their respective first end 61, the connecting rods 6 are engaged onto the connecting pins provided on the sliding plates 4 and, at their respective second end 62, the connecting rods 6 are engaged onto the connecting pins 53 provided on the secondary bracket 5. As it can be appreciated on the drawings, the connecting rods 6 define an expanding parallelogram that allows a complex movement of the secondary bracket 5 with respect to the primary bracket 3.

Thus, the complex movement of the secondary bracket 5 with respect to the primary bracket 3 is determined (i) by an axial movement of the sliding plates 4 into the elongated openings 34 and (ii) by a rotational movement of the connecting rods 6 that form a expanding parallelogram and thus can ensure that the secondary bracket 5 has a movement having a vertical and a longitudinal component.

Locking means can be provided to immobilize the secondary bracket 5 with regard to the sliding plates 4 and the primary bracket 3 in a position that is preferred by a driver. An elastic means such as a spring (not illustrated) can be interposed between the secondary bracket 5 and the sliding plates 4 or between the secondary bracket 5 and the sliding plates 4 to assist the movement of the secondary bracket 5. It is also envisaged to fit an electric or hydraulic or pneumatic motor to provide power assistance to the movement of the secondary bracket 5.

The movement of the secondary bracket 5 with respect to the primary bracket 3 can be limited. In the illustrated embodiment of the invention, one of the connecting pins 53a that is found on the secondary bracket 5 is longer than the other two. Thanks to this extension, the oversized connecting pin 53a emerges into the window 35 provided in the primary bracket 3. Thus, the overall movement of the secondary bracket 5 is limited by the boundary of the window 35 as the movement of the secondary bracket 5 is stopped when the oversized connecting pin 53a touches the boundary of the window 35. Although other geometries might be considered, the quadrangular window 35 of the illustrated embodiment determines four extreme positions corresponding to each corner of the window.

In the depicted embodiment of the invention, the movement limitation function is conveniently carried by a connecting pin 53a which also receives a connecting rod 6. It can be envisaged to provide the secondary bracket with a pin whose sole purpose would be to limit the scope of the secondary bracket's movement 5 with respect to the primary bracket 3.

The device according to the invention is further equipped with a steering shaft support 7 that guides the upper end shaft 8 of the steering column. In the drawing, the representation of the steering column is limited to the upper end shaft 8 which can be connected to another shaft of a steering column through a cardan joint 9. The steering shaft support 7 is pivotally connected to the secondary bracket 5 so as to offer an angular adjustment of the position of the steering wheel 10 that is secured onto the upper end of the steering shaft 8.

The steering shaft support 7 incorporates two side faces 71 that are each provided with two connecting pins 72 whereas the secondary bracket 5 is provided with two concentric curved openings 54 which, in a side view, have a centre of curvature that coincides with the centre of the steering wheel 10 or is close to the centre of the steering wheel 10. The distance between the two connecting pins 72 equals the distance between the two curved openings 54; the connection between the steering shaft support 7 and the secondary bracket 5 is established by inserting the two connecting pins 71 into the two curved openings 54. Thus, the angular movement of the steering wheel 10 is determined by the movement of the connecting pins 71 into the curved openings 54. It is important to emphasize one of the advantages of the device 1 insofar as adjustment of the angular position of the steering wheel 10 is independent from adjustment of steering wheel position in vertical and axial position. This proves to be a significant advantage as this makes it possible to maintain the vehicle driver's preferred angular position when the steering wheel is moved into a retracted position and when the position of the steering wheel is vertically and longitudinally adjusted as it will be clear from the coming description of the operation of the device 1.

Thus, on the one hand, the device according to the invention provides a wide range of steering wheel adjustment.

Figure 2:
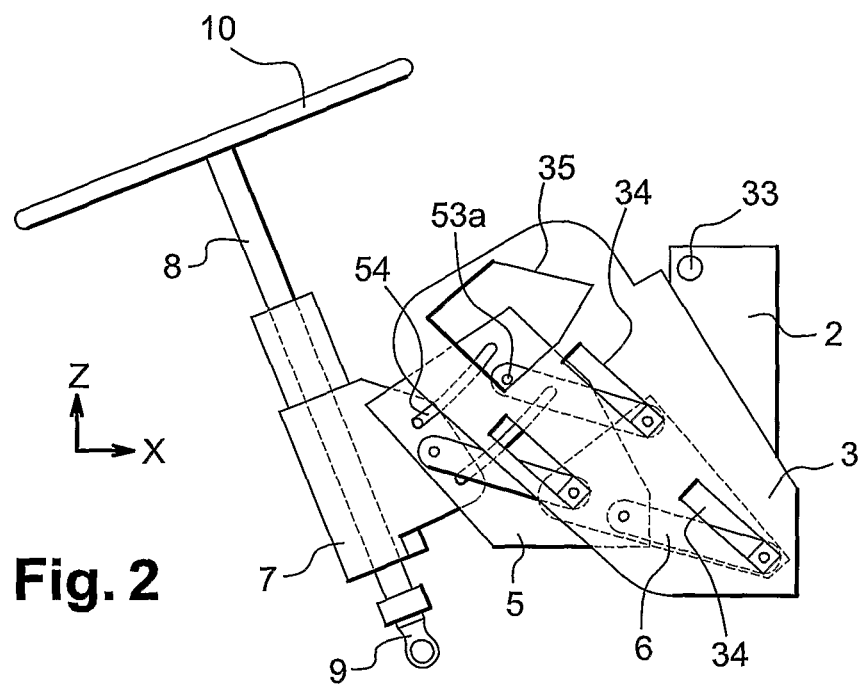
FIG. 2 is a side view of this embodiment.
Figure 3:
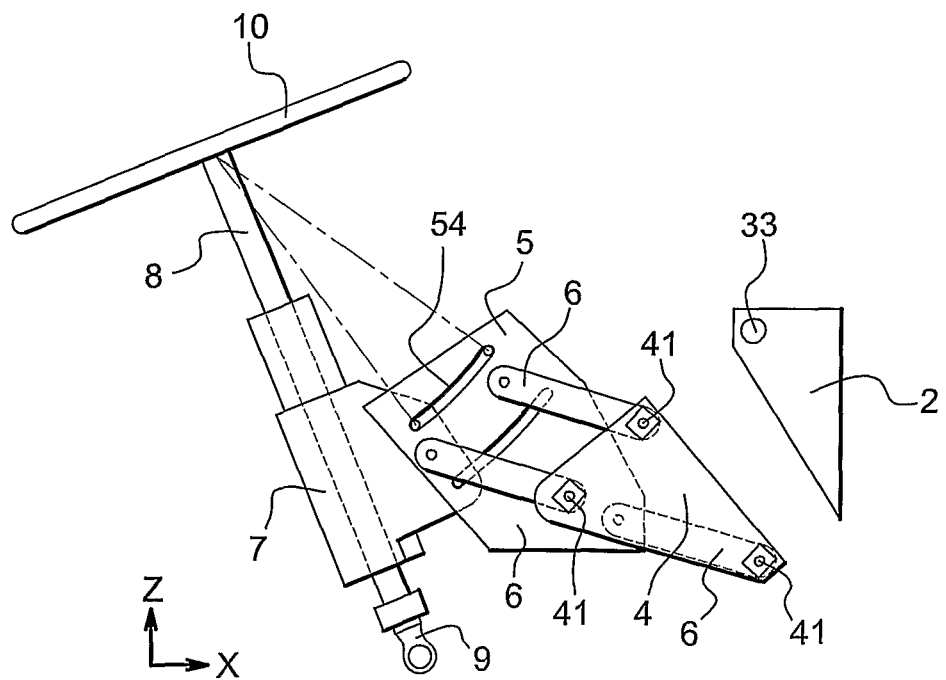
FIG. 3 is a side view where a primary bracket is omitted.

FIG. 2 is a side view of the device according to the invention in one of its four extreme positions. FIG. 3 is a view similar to FIG. 2 wherein the primary bracket 3 is omitted.

From an initial steering wheel 10 position such as, for example, the position of FIG. 2 or 3, a driver according to his requirements can adjust the position of the steering wheel 10 within the combination of the following movements:

(i) an axial movement having a substantial vertical component as the position of the secondary bracket 5 can be adjusted along the elongated openings 34;

(ii) a longitudinal direction as the position of the secondary bracket 5 can be adjusted according to the movement of the connecting rods 6;

(iii) an angular position as the steering wheel 10 as the steering shaft support 7 can be tilted with respect to the secondary bracket 5.

Figure 4:
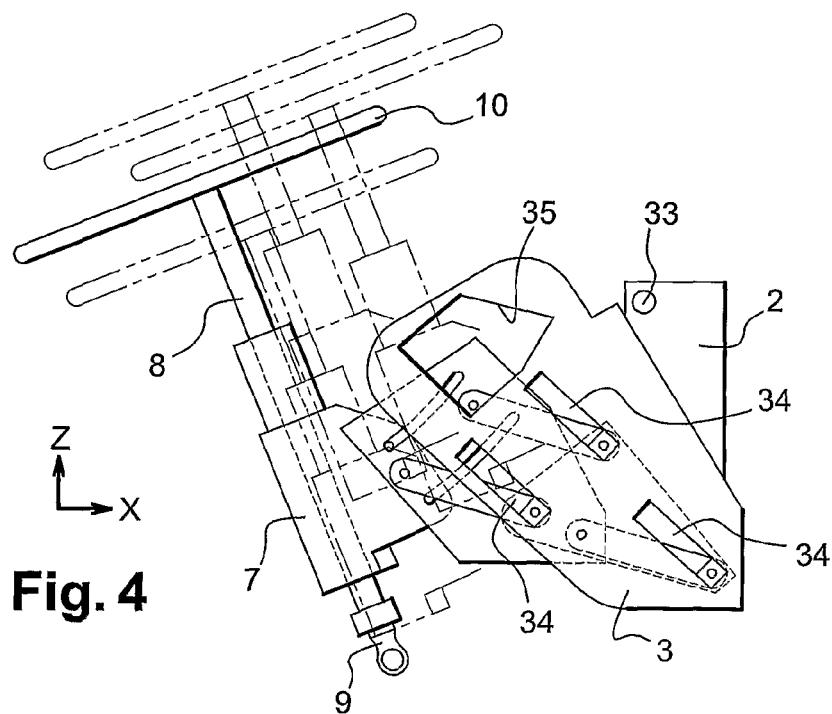
FIGS. 4 and 5 illustrate the range of driving positions that can be carried out by a steering wheel supported by a device according to the invention.
Figure 5:
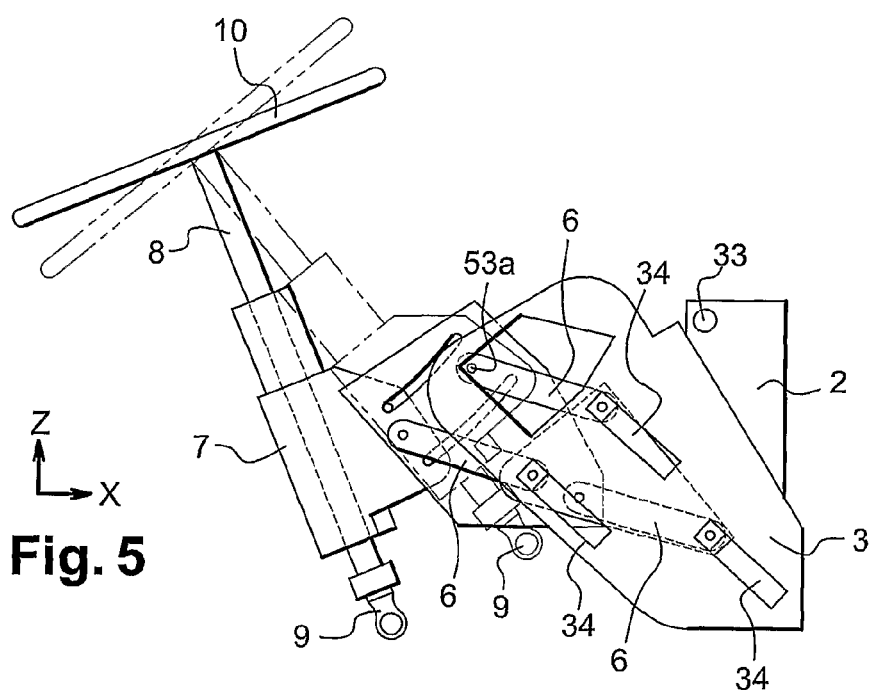

In FIGS. 4 to 5, the wide scope of positions of the steering wheel 10 can be readily visualised. On FIG. 4 is shown the various positions when the steering wheel is moved along movements as defined in the above paragraph (i) and (ii). On FIG. 5 is shown the positions of the steering wheel when it is moved along a movement as defined in paragraph (iii).

On the other hand, the device 1 according to the invention allows the steering wheel 10 to be moved into a retracted position while keeping the individual driving position that suits a specific driver.

FIGS. 6 and 7 illustrate how, once a driver has positioned the steering wheel 10 according to his individual requirements, as shown in solid lines on FIG. 7, the device according to the invention makes it possible to maintain the driver's preferred position while positioning the steering wheel 10 in a retracted position wherein the steering wheel 10 does not protrude into the cabin shown in solid lines on FIG. 6 and in semi-dashed lines on FIG. 7. This is achieved by the rotation of the primary bracket 3 with respect to the mounting console 2. In the rotation movement of the primary bracket 3, the position of the specific axial, longitudinal and angular settings that are exactly suited to a driver remain unaltered.

The invention accomplishes the foregoing by providing a device for adjusting the position of a steering wheel 10 whose kinematics is divided into a first functional unit—primary bracket 3—that can rotate with respect to a vehicle body and operatively connected to the first functional unit, a second functional unit—secondary bracket 4 and steering shaft support 7—that allows adjustment of a according to one or more direction of a steering wheel 10.

A further significant advantage of the invention is that the angular adjustment of the steering wheel 10 remains unaltered when the position of the said steering wheel is adjusted in longitudinally and/or vertically. This is achieved by the expanded parallelogram that is interposed between the primary bracket 3 and the secondary bracket 5. FIG. 4 shows in dotted lines different possible positions taken up by the steering wheel 10. As can be appreciated on this Figure, the steering wheel angular adjustment remains unaltered when the steering wheel 10 is moved longitudinally and axially.

Although not illustrated in the drawings, the device 1 is provided with locking means that can lock the device once a driver has found a suitable position and that can immobilize individually and independently each joint that forms the kinematic line that defines the device 1 according to the invention.

The invention is not limited to the illustrative embodiments described above and shown in the drawings, but can be varied within the scope of the following claims.

The invention claimed is:

1. A device for adjusting, a position of a steering wheel secured to a steering shaft relative to a vehicle body, comprising
    a primary bracket joined to the vehicle body with at least one degree of freedom in rotation,
    the steering shaft, and
    at least one adjustable connection arranged between the steering shaft and the primary bracket and permitting at least angular adjustment, of a position of the steering shaft with respect to the primary bracket,
    wherein the primary bracket is capable of rotating relative to the vehicle body according to the at least one degree of freedom while maintaining unaltered an orientation of the steering shaft with respect to the primary bracket,
    wherein the device further comprises a secondary bracket arranged between the steering shaft and the primary bracket and that is movable with respect to the primary bracket, and
    a further adjustable connection for joining the steering shaft onto the secondary bracket and capable of angularly adjusting the position of the steering shaft with regard to the secondary bracket.

2. The device according to claim 1, wherein the primary bracket includes a pin for permitting rotation of the primary bracket about one or more bores having a fixed position with regard to the vehicle body.

3. The device according to claim 1, wherein the primary bracket has a U shape comprised of two lateral wings connected by a back plate.

4. The device according to claim 1, wherein the device incorporates at least one lock capable of immobilizing the primary bracket with regard to the vehicle body.

5. The device according to claim 1, wherein the adjustable connection provides adjustment of the steering wheel's position in a longitudinal direction with respect to the primary bracket.

6. The device according to claim 1, wherein the adjustable connection provides adjustment of the steering wheel's position in a vertical direction with respect to the primary bracket.

7. The device according to claim 6, wherein the primary bracket comprises a plurality of lateral wings and each lateral wing of the primary bracket is provided with at least two parallel elongated windows.

8. The device according to claim 1, wherein the secondary bracket is arranged to be movable with respect to the primary bracket along a longitudinal direction and a vertical direction.

9. The device according to claim 8, wherein the device incorporates at least one lock capable of immobilizing the secondary bracket with regard to the primary bracket.

10. The device according to claim 8, wherein the device comprises a further adjustable connection for adjustably joining the steering shaft onto the secondary bracket with at least one degree of freedom.

11. The device according to claim 8, wherein the at least one lateral wing of the primary bracket is provided with a polygonal window wherein a pin attached to the secondary bracket is engaged.

12. The device according to claim 11, wherein the window provided in the lateral wing of the primary bracket is substantially quadrangular.

13. The device according to claim 8, wherein the primary bracket is provided with at least one elongated window along which the secondary bracket is guided.

14. The device according claim 13, wherein the device comprises at least one sliding plate guided by the at least one elongated windows onto which the secondary bracket is attached.

15. The device according to claim 14, wherein the device comprises two sliding plates respectively guided by the elongated windows of each lateral wing of the primary bracket.

16. The device according to claim 14, wherein the device further comprises at least two connecting rods having each a first end and a second end, the first end of each connecting rod being rotatably attached to a sliding plate and the second end of each connecting rod being rotatably connected to the secondary bracket, the two connecting rods defining an expanding parallelogram allowing a combined longitudinal and transversal movement of the secondary bracket with respect to the primary bracket.

17. The device according to claim 16, wherein each sliding plates is connected to the secondary bracket with three connecting rods.

18. The device according to claim 16, wherein the secondary bracket has a U shape comprised of two lateral wings connected by a back plate, each lateral wing having connecting pins onto which are connected the second end of the connecting rods.

19. The device according to claim 14, wherein the device incorporates at least one lock capable of immobilizing at least one of the sliding plates with regard to the primary bracket.

20. The device according to claim 14, wherein the device incorporates at least one lock capable of immobilizing the secondary bracket with regard to at least of the sliding plates.

21. The device according to claim 1, wherein the secondary bracket comprises at least one lateral wing that is provided with at least one curved opening wherein a steering shaft support is guided along a curved path.

22. The device according to claim 21, wherein each lateral wing of the secondary bracket includes two concentric curved openings wherein two guiding pins attached to the two side faces of the steering shaft support.

23. The device according to claim 21, wherein the at least one curved opening has a centre of curvature that substantially coincides with the centre of the steering wheel.

24. The device according to claim 1, wherein the device incorporates a lock capable of immobilizing the steering shaft with regard to the secondary bracket.

* * * * *